US012454229B2

(12) United States Patent
Kohama et al.

(10) Patent No.: US 12,454,229 B2
(45) Date of Patent: Oct. 28, 2025

(54) SOUND ABSORBING MEMBER MOUNT ASSEMBLY

(71) Applicant: TOYOTA BOSHOKU KABUSHIKI KAISHA, Aichi-ken (JP)

(72) Inventors: Takenori Kohama, Aichi-ken (JP); Akira Fujisawa, Gifu (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 426 days.

(21) Appl. No.: 18/143,140

(22) Filed: May 4, 2023

(65) Prior Publication Data
US 2023/0406233 A1   Dec. 21, 2023

(30) Foreign Application Priority Data
May 27, 2022   (JP) .................................. 2022-086606

(51) Int. Cl.
*B60R 13/08*   (2006.01)
(52) U.S. Cl.
CPC .. *B60R 13/0815* (2013.01); *B60R 2013/0807* (2013.01)
(58) Field of Classification Search
CPC . B60R 13/0206; B60R 13/08; B60R 13/8015; B60R 2013/0807
See application file for complete search history.

(56) References Cited

U.S. PATENT DOCUMENTS

| | | | |
|---|---|---|---|
| 6,045,921 A * | 4/2000 | Restaino | B60R 13/0243 428/521 |
| 2018/0022298 A1* | 1/2018 | Davies | B60R 13/0838 181/294 |
| 2019/0092254 A1* | 3/2019 | Kato | G10K 11/162 |
| 2020/0139902 A1* | 5/2020 | Furuzawa | B60R 13/08 |

FOREIGN PATENT DOCUMENTS

| | | | |
|---|---|---|---|
| EP | 0730999 A1 * | 9/1996 | ........... B29C 44/188 |
| JP | 2003-252125 | 9/2003 | |
| JP | 2013-173421 | 9/2013 | |
| WO | WO-2016191548 A1 * | 12/2016 | ......... B60R 13/0838 |

OTHER PUBLICATIONS

JP 2012245893 A (Year: 2012).*
DE 202012101389 U1 (Year: 2013).*
JP 2016203919 A (Year: 2016).*
Japan, Notice of Reasons for Refusal received in JP Application No. 2022-086606, mailed Jul. 29, 2025, and English.

* cited by examiner

Primary Examiner — Lori Lyjak
(74) Attorney, Agent, or Firm — GREENBLUM & BERNSTEIN, P.L.C.

(57) ABSTRACT

A sound absorbing member mount assembly includes a vehicular interior component and a sound absorbing member. The vehicular interior component includes a protrusion and the protrusion protrudes from a vehicular exterior side surface of the vehicular interior component and includes a support portion having a flat surface. The sound absorbing member is disposed on the vehicular interior component and

(Continued)

includes a slit and a positioning portion that is adjacent to the slit. The positioning portion is to be bent and project toward a vehicular exterior side and is supported by the support portion of the protrusion. With the positioning portion being supported by the support portion, the sound absorbing member is positioned with respect to the vehicular interior component.

19 Claims, 6 Drawing Sheets

SOUND ABSORBING MEMBER MOUNT ASSEMBLY

CROSS REFERENCE TO RELATED APPLICATION

This application claims priority from Japanese Patent Application No. 2022-86606 filed on May 27, 2022. The entire contents of the priority application are incorporated herein by reference.

TECHNICAL FIELD

The present disclosure relates to a sound absorbing member mount assembly.

BACKGROUND

A sound absorbing member is mounted on a vehicular interior component. For example, the sound absorbing member includes holes through which clip bosses (projections) of the vehicular interior component are inserted. By inserting the clip bosses through the holes, the sound absorbing member is mounted on a rear surface of the vehicular interior component.

The size of the holes in the sound absorbing member needs to be larger than the size of the clip bosses due to the mounting tolerances. This allows the sound absorbing member to move easily with respect to the interior component and the position of the sound absorbing member may not correspond to the correct position with respect to the interior component. Therefore, the interior component and the sound absorbing member need to include positioning marks and the sound absorbing member needs to be mounted on the interior component carefully with aligning the positioning marks. Furthermore, with the sound absorbing member including the holes, the portions that are cut out from the sound absorbing member for making the holes become waste and this increases a cost.

SUMMARY

The feature of the technology disclosed herein is to provide a sound absorbing member mount assembly in which a sound absorbing member is likely to be mounted at a correct position with respect to a vehicular interior component and a cost can be reduced.

The technology described herein relates to a sound absorbing member mount assembly including a vehicular interior component and a sound absorbing member. The vehicular interior component includes a protrusion and the protrusion protrudes from a vehicular exterior side surface of the vehicular interior component and includes a support portion having a flat surface. The sound absorbing member is disposed on the vehicular interior component and includes a slit and a positioning portion that is adjacent to the slit. The positioning portion is to be bent and project toward a vehicular exterior side and is supported by the support portion of the protrusion. With the positioning portion being supported by the support portion, the sound absorbing member is positioned with respect to the vehicular interior component.

DETAILED DESCRIPTION

One embodiment of the present technology will be described with reference to FIGS. 1 to 6. A sound absorbing member mount assembly 1 of mounting a sound absorbing member 30 on a vehicular pillar garnish 10, which is an example of a vehicular interior component, will be described. In the drawings, arrows FR, RR, UP, LOW, and OUT represent a vehicular front side, a vehicular rear side, an upper side, a lower side, and a vehicular exterior side, respectively.

Figure 1:
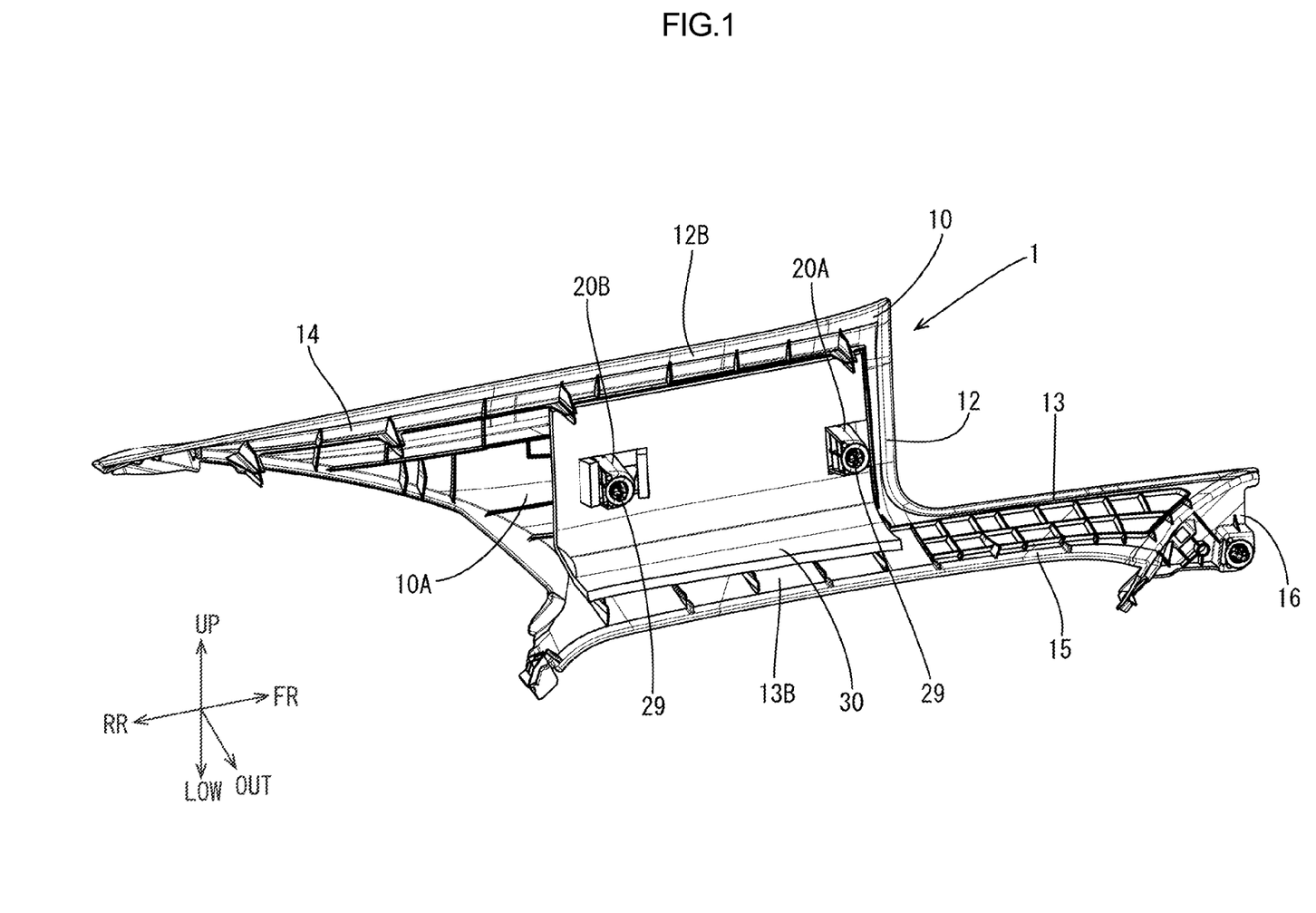
FIG. 1 is a perspective view illustrating a sound absorbing member mount assembly.
Figure 2:
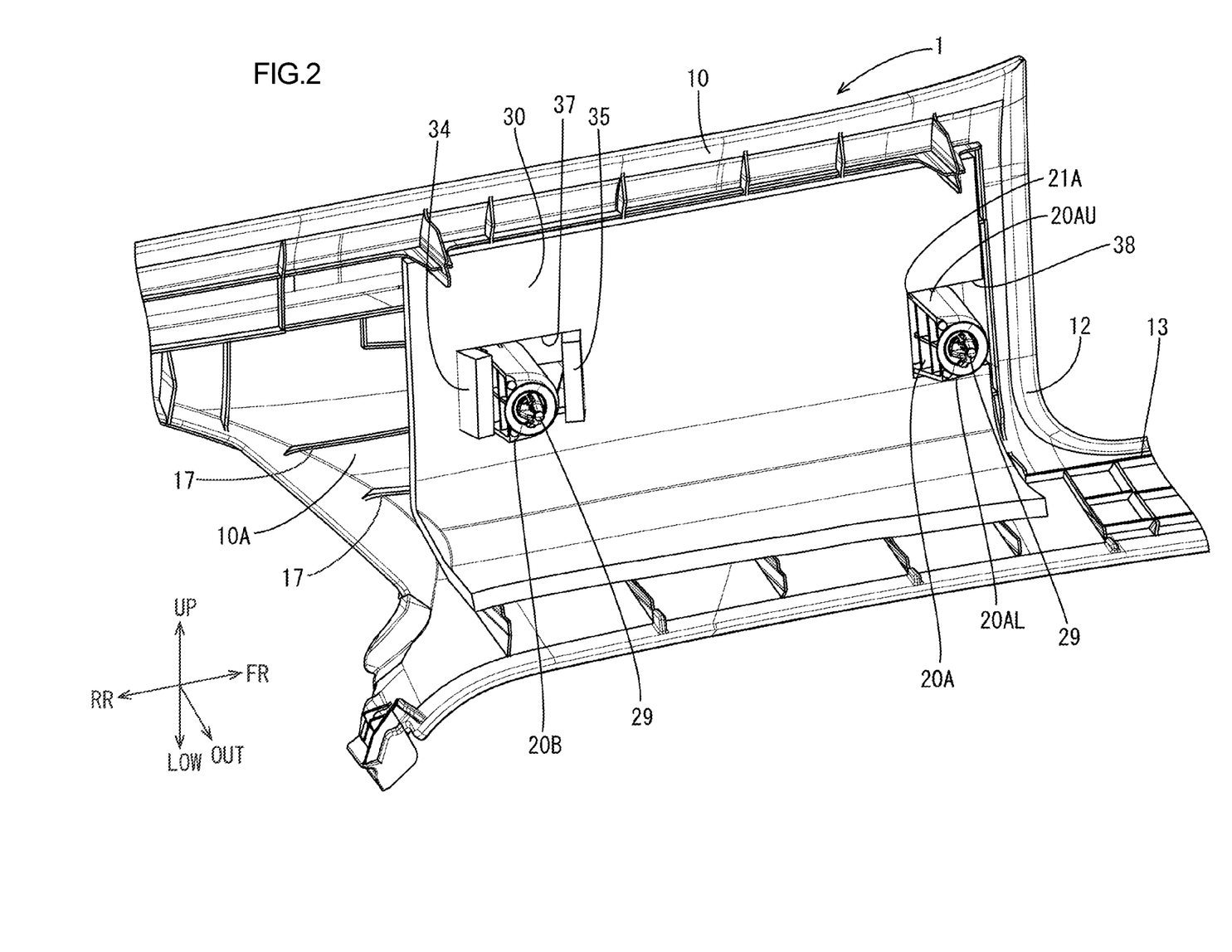
FIG. 2 is a magnified perspective view illustrating a portion of the sound absorbing member mount assembly in FIG. 1.

FIGS. 1 and 2 are perspective views illustrating the sound absorbing member mount assembly 1 of mounting the sound absorbing member 30 on the vehicular pillar garnish 10 seen from the vehicular exterior side. As illustrated in FIGS. 1 and 2, the pillar garnish 10 is a rectangular plate member that is bent in a L shape seen in a vehicular front-rear direction as a whole.

The pillar garnish 10 includes a first wall portion 12 and a second wall portion 13. The first wall portion 12 extends vertically along an upper-bottom direction. The second wall portion 13 extends horizontally from a lower edge of the first wall portion 12 toward the vehicular exterior side. The first wall portion 12 includes a body portion 12B and a rear extending portion 14 that extends rearward from a rear end of the body portion 12B. The rear extending portion 14 is tapered toward the vehicular rear side. The second wall portion 13 includes a body portion 13B, a front extending portion 15, and a front mount portion 16. The front extending portion 15 extends frontward from a front end of the body portion 13B and has a rectangular shape that extends in the vehicular front-rear direction. The front mount portion 16 is bent from the front end of the front extending portion 15 toward a vehicular interior side and bent again downward. The front mount portion 16 extending parallel to the first wall portion 12. The pillar garnish 10 of this embodiment has an elongated shape extending in the vehicular front-rear direction as a whole.

As illustrated in FIGS. 1 and 2, the first wall portion 12 of the pillar garnish 10 includes two clip seats 20A, 20B (protrusions) that are arranged in the vehicular front-rear direction. The clip seats 20A, 20B protrude from a vehicular exterior side surface 10A of the pillar garnish 10. The vehicular exterior side surface 10A is opposite an outer panel that is arranged on a vehicular exterior side of the pillar garnish 10. Clips 29 are fitted in the clip seats 20A, 20B and the pillar garnish 10 is attached to the outer panel with the clips 29. The clip seats 20A, 20B have a same shape and a same size except that the clip seat 20A does not include a reinforcement rib 27. The clip seat 20A (first protrusion) is disposed on a front section of the body portion 12B and the clip seat 20B (protrusion) is disposed on a rear section of the body portion 12B.

Figure 3:
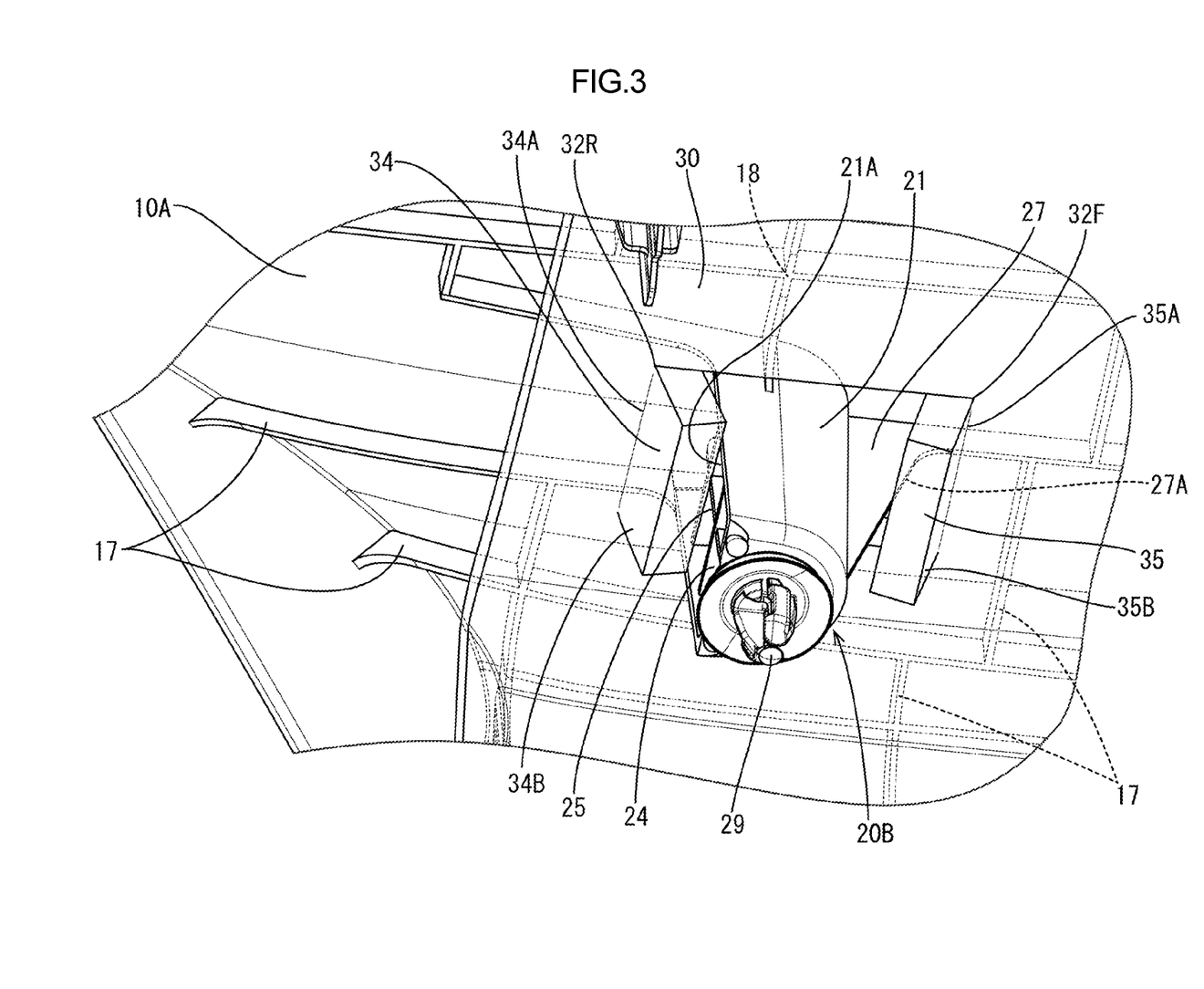
FIG. 3 is a magnified perspective view illustrating a portion of the sound absorbing member mount assembly in FIG. 2.
Figure 4:
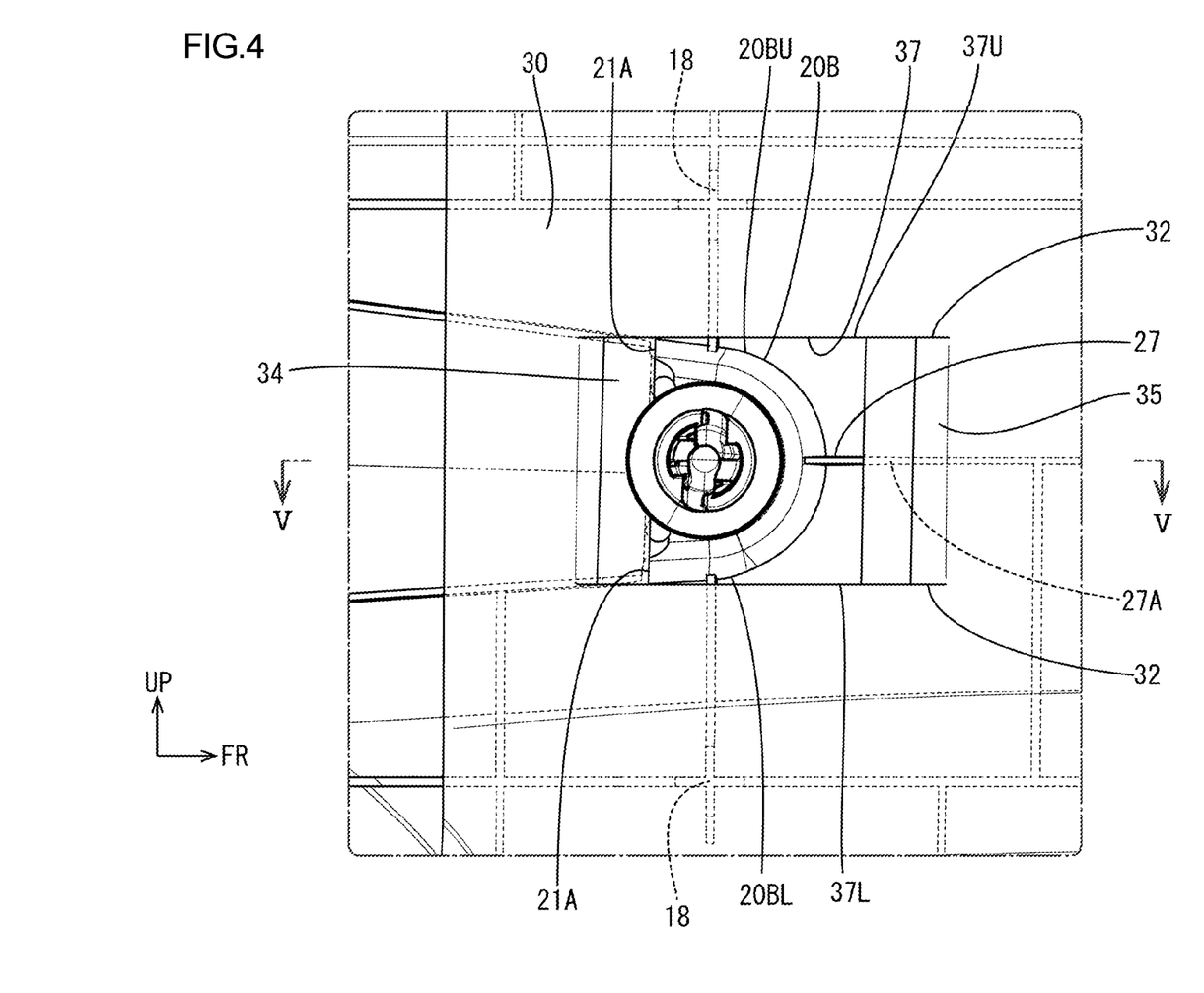
FIG. 4 is a view of a portion of the sound absorbing member seen from a vehicular exterior side.
Figure 5:
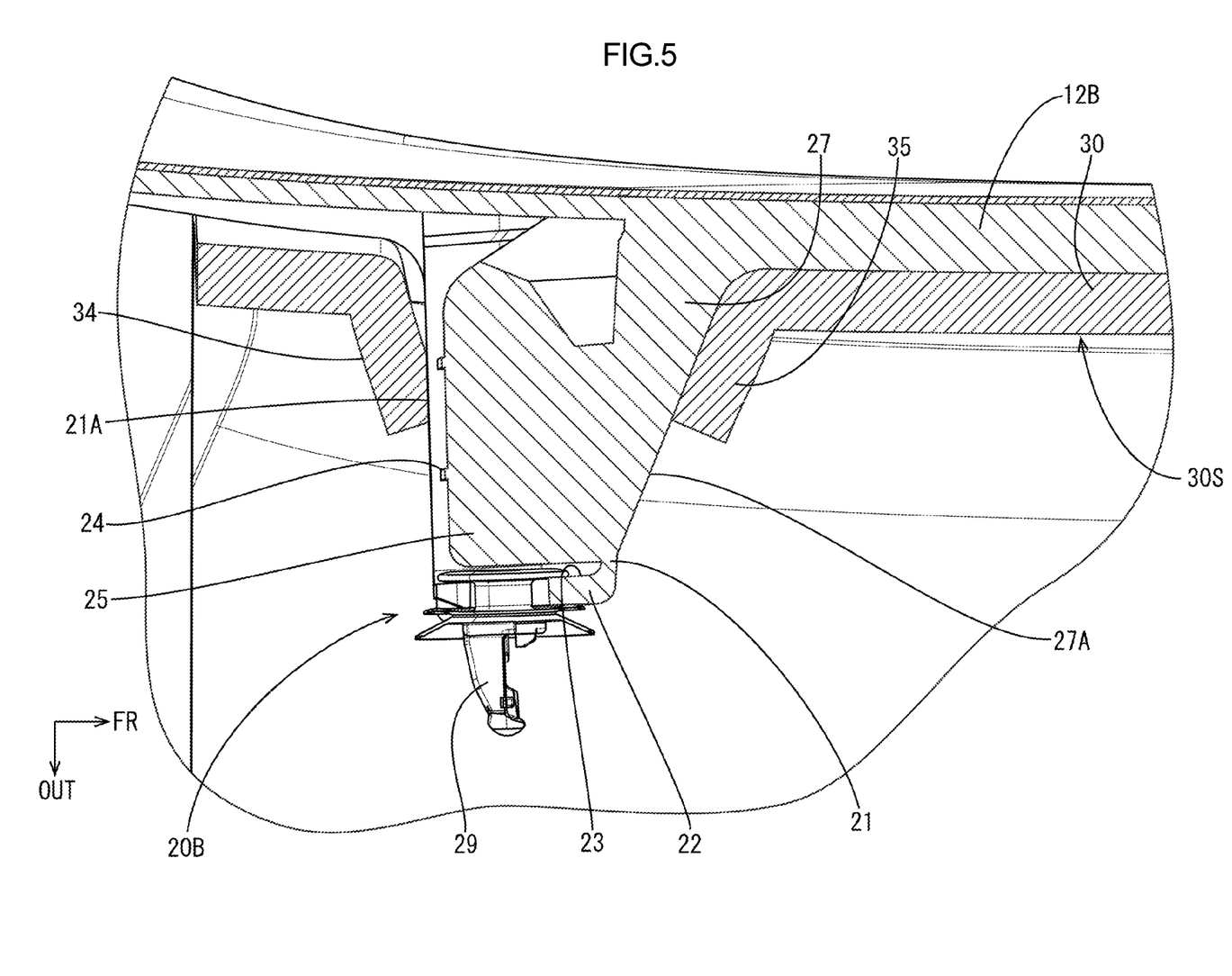
FIG. 5 is cross-sectional view taken along line V-V.

The clip seats 20A, 20B have a similar configuration and the configuration of the clip seat 20B will be described. As illustrated in FIGS. 3 and 4, the clip seat 20B has a semi-circular columnar shape as a whole. Specifically, as illustrated in FIGS. 3 and 5, the clip seat 20B includes a side wall portion 21 and a mounting portion 22. The side wall portion 21 projects from the vehicular exterior side surface 10A of the first wall portion 12 toward the vehicular exterior side. The side wall portion 21 is curved such that a cross-sectional shape taken along a direction vertical to a protruding direction is a U-shape. As illustrated in FIGS. 4 and 5, the mounting portion 22 extends radially from a distal end of the side wall portion 21 with respect to the protruding direction toward a center of the U-shape of the side wall portion 21 and along the vehicular exterior side surface 10A. The mounting portion 22 has a U-shaped plate shape. The side wall portion 21 has an opening at the ends of the U-shaped wall and the side wall portion 21 opens rearward. The side wall portion 21 includes opening edges 21A (flat surfaces) at the ends of the U shape. As illustrated in FIG. 5, the clip seat 20B includes a mount groove 23 between the mounting portion 22 and a vertical wall 25. A fitting portion of the clip 29 is inserted in the mount groove 23.

As illustrated in FIG. 3, the clip seat 20B includes lateral walls 24 and the vertical wall 25 that extend inside the clip seat 20B and define an inner space of the clip seat 20B into multiple spaces. The lateral walls 24 extend parallel to and opposite the first wall portion 12. The vertical wall 25 extends vertically with respect to the lateral walls 24 and extends in the vehicular front-rear direction. The lateral walls 24 and the vertical wall 25 do not extend outside the clip seat 20B. As illustrated in FIG. 5, the lateral walls 24 and the vertical wall 25 do not project outward from the opening edges 21A of the side wall portion 21.

As illustrated in FIGS. 3 and 5, the clip seat 20B that is disposed in the rear section of the body portion 12B includes a reinforcement rib 27. The reinforcement rib 27 extends from a middle of an outer surface of the side wall portion 21 frontward in the vehicular front-rear direction. The reinforcement rib 27 extends outward in a radial direction of the side wall portion 21. The reinforcement rib 27 also extends from the vehicular exterior side surface 10A toward the vehicular exterior side. The reinforcement rib 27 has a triangular plate shape as a whole. The clip seat 20A does not include the reinforcement rib 27.

As illustrated in FIGS. 2 and 3, the pillar garnish 10 includes ribs 17 on the vehicular exterior side surface 10A. The ribs 17 extend in the upper-bottom direction and the vehicular front-rear direction and are formed in a mesh pattern. The ribs 17 project from the vehicular exterior side surface 10A and have a same projection dimension. The sound absorbing member 30 is disposed on the ribs 17. As illustrated in FIGS. 3 and 4, the ribs 17 includes welding sections 18 for connecting the sound absorbing member 30 and the pillar garnish 10 with welding.

Figure 6:
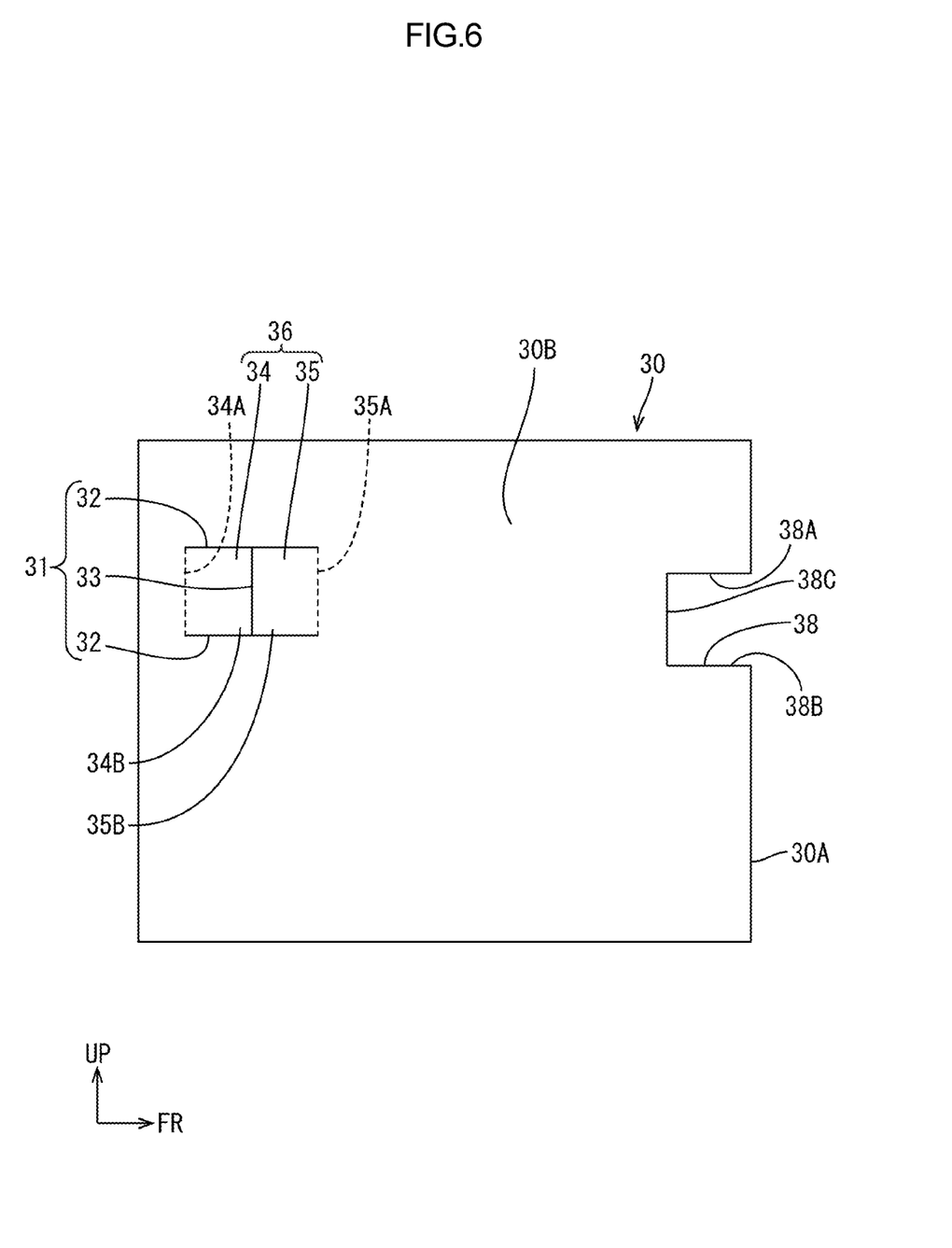
FIG. 6 is a plan view of a sound absorbing member.

The sound absorbing member 30 is made of non-woven fabric that is formed in a felt having a certain thickness. As illustrated in FIG. 2, the sound absorbing member 30 is mounted on the vehicular exterior side surface 10A of the pillar garnish 10. As illustrated in FIG. 6, the sound absorbing member 30 includes a slit 31 in a portion of the sound absorbing member 30 that overlaps the clip seat 20B when the sound absorbing member 30 is mounted on the pillar garnish 10.

As illustrated in FIG. 6, the slit 31 includes a pair of lateral slits 32 (first slits) that extend in the vehicular front-rear direction and a vertical slit 33 (second slit) that connects the lateral slits 32. The vertical slit 33 extends between middle portions of the lateral slits 32. The lateral slits 32 and the vertical slit 33 are configured as the slit 31 having an H shape. The sound absorbing member 30 includes a body portion 30B and a positioning portion 36 that is adjacent to the slit 31. The positioning portion 36 is surrounded and defined by the slit 31. The positioning portion 36 that is between the two lateral slits 32 is divided by the vertical slit 33 into a first portion 34 and a second portion 35 that are disposed on the vehicular rear side and front side, respectively. The first portion 34 is a portion of the positioning portion 36 and is surrounded by a C-shaped slit that includes rear halves of the two lateral slits 32 and the vertical slit 33. The second portion 35 is a portion of the positioning portion 36 and is surrounded by a C-shaped slit that includes front halves of the two lateral slits 32 and the vertical slit 33.

More in detail, as illustrated in FIG. 4, with the sound absorbing member 30 being disposed at a correct position on the vehicular exterior side surface 10A of the pillar garnish 10, the lateral slits 32 are disposed directly above or slightly away from an upper edge 20BU and a lower edge 20BL of an outer surface of the side wall portion 21, respectively.

As illustrated in FIG. 3, with the sound absorbing member 30 being disposed at a correct position on the vehicular exterior side surface 10A of the pillar garnish 10, the vertical slit 33 is disposed at a middle of the clip seat 20B. With such a configuration of the slit 31, the positioning portion 36 of the sound absorbing member 30 is configured as a double door such that the first portion 34 and the second portion 35 can be moved toward the vehicular exterior side to be opened.

The length of the lateral slits 32 is determined as follows. With the sound absorbing member 30 being correctly mounted on the vehicular exterior side surface 10A of the pillar garnish 10, with reference to FIG. 3, a front end 32F of the lateral slit 32 is disposed at a same position as a front end of the reinforcement rib 27 or in front of the front end of the reinforcement rib 27 and a rear end 32R of the lateral slit 32 is disposed at a same position as a rear end of the clip seat 20B or the opening edge 21A (a rear end of the side wall portion 21) or disposed behind the rear end of the clip seat 20B.

As illustrated in FIGS. 2 and 6, the sound absorbing member 30 includes a recessed portion 38 at a position corresponding to the clip seat 20A. The recessed portion 38 is recessed from a front edge 30A of the sound absorbing member 30 and has a rectangular shape. In detail, the recessed portion 38 includes side edges 38A, 38B and a bottom edge 38C. The side edges 38A, 38B extend from the front edge 30A of the sound absorbing member 30 and are opposite each other. The bottom edge 38C extends to connect the side edges 38A and 38B. With the sound absorbing member 30 being correctly mounted on the vehicular exterior side surface 10A of the pillar garnish 10, the clip seat 20A is disposed in the recessed portion 38. The length of the bottom edge 38C is determined such that the side edges 38A, 38B are contacted with or disposed slightly away from the upper edge 20BU and the lower edge 20BL of the outer surface of the side wall portion 21, respectively. The length of the side edges 38A, 38B is determined such that the opening edges 21A of the clip seat 20A are contacted with the bottom edge 38C.

To mount the sound absorbing member 30 on the vehicular exterior side surface 10A of the pillar garnish 10, the sound absorbing member 30 is disposed on the vehicular exterior side surface 10A such that the slit 31 is disposed above the clip seat 20B and the clip seat 20A is fitted in the recessed portion 38. Then, the sound absorbing member 30 is pressed toward the vehicular exterior side surface 10A of the pillar garnish 10. Accordingly, as illustrated in FIGS. 1 to 5, the slit 31 is widely opened by the clip seat 20B such that the first portion 34 and the second portion 35 are moved toward the vehicular exterior side.

More in detail, with the positioning portion 36 of the sound absorbing member 30 being pressed by the clip seat 20B, as illustrated in FIG. 3, the first portion 34 of the positioning portion 36 is bent along a first bending portion 34A toward the vehicular exterior side and the second portion 35 is bent along a second bending portion 35A toward the vehicular exterior side. Accordingly, as illustrated in FIG. 4, a mount hole 37 is formed between the two lateral slits 32. The positioning portion 36 is continuous to the body portion 30B via the bending portions 34A, 35A and movable to close and open the mount hole 37. With the sound absorbing member 30 being mounted on the pillar garnish 10 and the clip seat 20B being inserted in the mount hole 37, the positioning portion 36 including the first portion 34 and the second portion 35 is bent along the bending portions 34A, 35A and projects toward the vehicular exterior side and is supported by the side wall portion 21 of the clip seat 20B. As illustrated in FIGS. 3 and 5, with the first portion 34 being bent along the first bending portion 34A toward the vehicular exterior side, the first portion 34 is away from the body portion 30B with being continuous to the body portion 30B via the first bending portion 34A and projects toward the vehicular exterior side from a vehicular exterior side surface 30S of the body portion 30B and an edge portion 34B (a projecting end portion) of the first portion 34 including the hole edge of the vertical slit 33 is away from the body portion 30B and contacted with the two opening edges 21A. The first portion 34 that is bent along the first bending portion 34A and projects from the vehicular exterior side surface 30S of the body portion 30B is supported by the two opening edges 21A that are spaced away from each other with respect to the upper-bottom direction. Namely, the first portion 34 is in contact with and supported by the two portions of the side wall portion 21 that are away from each other.

The two opening edges 21A are disposed away from each other and the side wall portion 21 has the opening between the two opening edges 21A. The portions of the opening edges 21A that are contacted with the first portion 34 are on the same plane. With such a configuration, the first portion 34 is contacted with the two opening edges 21A so as to straddle the opening between the two opening edges 21A and is supported by the two opening edges 21A stably. Namely, with the first portion 34 being contacted with the two opening edges 21A of the side wall portion 21, the first portion 34 is supported by the two opening edges 21A at the two portions thereof. With at least two portions of the side wall portion 21 that are on the same plane being contacted with the first portion 34, the first portion 34 can be stably supported in a flat state. With the first portion 34, which is a plate-shaped member, being contacted with and overlapping the opening edges 21A (the support portion) which are flat, the first portion 34 can be stably supported. The first portion 34 is contacted with the opening edges 21A at two portions thereof that are away from each other in a longitudinal direction of the first portion 34. Therefore, the first portion 34 can be stably supported and the sound absorbing member 30 can be stably mounted on the pillar garnish 10. Further, the sound absorbing member 30 can be positioned accurately with respect to the pillar garnish 10.

With the second portion 35 being pushed by the clip seat 20B and bent along the second bending portion 35A toward the vehicular exterior side, the second portion 35 is away from the body portion 30B with being continuous to the body portion 30B via the second bending portion 35A and projects toward the vehicular exterior side from the vehicular exterior side surface 30S and an edge portion 35B (a projecting end portion) of the second portion 35 including the hole edge of the vertical slit 33 is away from the body portion 30B and contacted with an edge surface 27A of the reinforcement rib 27 as illustrated in FIG. 3. The second portion 35 that is bent along the second bending portion 35A and projects from the vehicular exterior side surface 30S of the body portion 30B is contacted with the reinforcement rib 27 and supported by the edge surface 27A of the reinforcement rib 27. As described before, with the first portion 34 and the second portion 35 being bent and the clip seat 20B being inserted in the mount hole 37, the upper hole edge 37U and the lower hole edge 37L of the mount hole 37 are contacted with or disposed slightly away from the upper edge 20BU and the lower edge 20BL of the clip seat 20B, respectively, as illustrated in FIG. 4.

With the clip seat 20B being inserted through the mount hole 37 as illustrated in FIG. 3, the first portion 34 and the second portion 35 of the sound absorbing member 39 hold the clip seat 20B with the resilient force of the first and second portions 34, 35 from two sides with respect to the front-rear direction. Therefore, the sound absorbing member 30 is less likely to be moved with respect to the pillar garnish 10 in the front-rear direction.

Furthermore, the sound absorbing member 30 can be positioned with respect to the pillar garnish 10 at the at least two portions including the clip seats 20A and 20B. Therefore, the sound absorbing member 30 is less likely to be rotated with respect to the pillar garnish 10. The two clip seats 20A, 20B are arranged along the longitudinal direction of the pillar garnish 10 as illustrated in FIG. 1. With such a configuration, a wire harness, for example, can be easily arranged to extend in the longitudinal direction.

After the sound absorbing member 30 is mounted and positioned on the pillar garnish 10, the sound absorbing member 30 is fixed to the pillar garnish 10 at the welding sections 18 with ultrasonic welding. Thus, the sound absorbing member 30 is mounted on the pillar garnish 10.

Next, operations and effects of this embodiment will be described. In the sound absorbing member mount assembly 1 of mounting the sound absorbing member 30 on the pillar garnish 10 according to this embodiment, the pillar garnish 10 includes the clip seat 20B that protrudes from the vehicular exterior side surface 10A, and the sound absorbing member 30 includes the slit 31 and the positioning portion 36 that is near the slit 31 and bent and projects from the vehicular exterior side surface 30S. The sound absorbing member 30 is disposed to overlap the pillar garnish 10. The first portion 34 surrounded by the slit 31 is moved by the clip seat 20B and projects from the vehicular exterior side surface 30S of the body portion 30B. The clip seat 20B includes the opening edge 21A (the support portion) that has a flat shape and supports the first portion 34. The sound absorbing member 30 is supported by the opening edge 21A (the support portion) and positioned with respect to the pillar garnish 10.

According to the above configuration, with using the opening edges 21A of the clip seat 20B, the sound absorbing member 30 can be positioned with respect to the pillar garnish 10. Specifically, the first portion 34 surrounded by the lateral slits 32 and the vertical slit 33 is pushed with the clip seat 20B so as to project from the surface of the body portion 30B of the sound absorbing member 30 toward the vehicular exterior side. Thus, only by pushing the first portion 34 with the clip seat 20B, the first portion 34 is moved and projects toward the vehicular exterior side and can be supported by the opening edges 21A. Accordingly, the sound absorbing member 30 can be mounted on and positioned with respect to the pillar garnish 10.

In the above configuration of this embodiment, the sound absorbing member 30 can be positioned at a correct position with respect to the vehicular interior component with using the resilient force of the first portion 34 that presses the two opening edges 21A. This simplifies the mounting operation of mounting the sound absorbing member 30 on the pillar garnish 10. Furthermore, with the first portion 34 being disposed to extend from one of the two opening edges 21A to the other one, the first portion 34 can be stably supported with the two portions. This increases the accuracy of positioning of the sound absorbing member 30 with respect to the pillar garnish 10.

In this embodiment, the sound absorbing member 30 includes the slit 31 that defines the first portion 34 and the second portion 35 in the portion corresponding to the clip seat 20B, and the first portion 34 and the second portion 35 support the clip seat 20B. Therefore, the first portion 34 and the second portion 35 are effectively used without becoming waste unlike the sound absorbing member including the through holes in the portions corresponding to the protrusions. The cost for disposal of waste can be reduced.

The slit 31 includes a pair of lateral slits 32 that extend parallel to each other and the vertical slit 33 that connects the lateral slits 32 at middle portions of the lateral slits 32 with respect to the extending direction of the lateral slits 32 and the slit 31 has an H shape. With the sound absorbing member 30 being mounted on the pillar garnish 10, the first portion 34 that is a portion of the sound absorbing member 30 surrounded by the lateral silts 32 and the vertical slit 33 is supported by the two opening edges 21A of the clip seat 20B and the second portion 35 that is another portion of the sound absorbing member surrounded by the lateral slits 32 and the vertical slit 33 is supported by the portion of the clip seat 20B (the edge surface 27A of the reinforcement rib 27) that is included an opposite side from the opening edges 21A.

With the configuration including the H-shaped slit 31 as described above, the portions (the first portion 34 and the second portion 35) of the sound absorbing member 30 that are surrounded by the slits 32, 33 can be opened like a double door and moved to project from the surface of the sound absorbing member 30. The portions (the first portion 34 and the second portion 35) that project from the surface of the sound absorbing member 30 are contacted with the pair of opening edges 21A of the clip seat 20B and the portion of the clip seat 20B that is included on an opposite side from the opening edges 21A. Thus, the pair of portions projecting from the sound absorbing member 30 are supported by the clip seat 20B on two opposing sides. Further, the sound absorbing member 30 can hold the clip seat 20B with using the resilient force. Therefore, the sound absorbing member 30 is less likely to be moved from a correct position with respect to the pillar garnish 10.

The clip seat 20B includes the reinforcement rib 27 projecting from a portion of the clip seat 20B, which is on an opposite side from the opening edges 21A, outward in a radial direction of the clip seat 20B. The reinforcement rib 27 also projects from the vehicular exterior side surface 10A. The second portion 35 of the sound absorbing member 30 that is surrounded by the C-shaped slit including the lateral slits 32 and the vertical slit 33 is supported by the edge surface 27A of the reinforcement rib 27.

According to the above configuration, even with the clip seat 20B including the reinforcement rib 27, the sound absorbing member 30 need not include a hole for receiving the reinforcement rib 27. The sound absorbing member 30 can be easily positioned with respect to the pillar garnish 10 including the clip seat 20B having the reinforcement rib 27. Further, the sound absorbing member 30 need not include the hole for receiving the reinforcement rib 27 and therefore, the portion of the sound absorbing member 30 corresponding to the hole does not become waste.

The pillar garnish 10 has an elongated shape and the lateral slits 32 extend along the elongated direction of the pillar garnish 10.

With the pillar garnish 10 having the elongated shape, the production tolerance or the tolerance of mounting the sound absorbing member 30 on the pillar garnish 10 with respect to the longitudinal direction may be increased. However, with the above configuration, the mount hole 37 including portions of the lateral slits 32 can receive the tolerance with respect to the longitudinal direction. The sound absorbing member 30 can be easily positioned with respect to the pillar garnish 10.

The pillar garnish 10 includes the clip seat 20A that projects from the vehicular exterior side surface 10A. The sound absorbing member 30 includes the recessed portion 38 in a portion corresponding to the clip seat 20A such that the clip seat 20A does not hit the sound absorbing member 30. The recessed portion 38 is recessed from the front edge 30A of the sound absorbing member 30.

With the above configuration, the sound absorbing member 30 can be positioned with respect to the pillar garnish 10 at the two positions where the clip seat 20A and the clip seat 20B are disposed. This restricts the sound absorbing member 30 from rotating with respect to the pillar garnish 10.

OTHER EMBODIMENTS

The technology described herein is not limited to the embodiments and modifications described above with reference to the drawings. The technical scope of the present disclosure may include the following embodiments and all modifications in the scope of claim or its equivalent scope.

(1) The vehicular interior component of the above embodiments may not be necessarily included in an automobile but may be included in various kinds of vehicles. Examples of the vehicles may be vehicles running on the ground such as a train and an amusement vehicle, flying vehicles such as an airplane and a helicopter, and vehicles on and in the sea such as a ship, and a submarine. The technology described herein may be applied to a vehicular door trim.

(2) The protrusions of the vehicular interior component may be mounting bosses.

(3) In the above embodiment, the clip seats 20A, 20B that are hollow and have the opening is configured as the protrusion and the two opening edges 21A are configured as the support portion. However, the protrusion may be solid and the support portion may be a flat surface of the protrusion. The support portion may have any configuration as long as that can stably support the first portion 34 of the sound absorbing member 30 with a large area. For example, the support portion may support the first portion 34 with not a point or a line but with a surface or at least two lines between which the support portion extends.

(4) The slit may not have an H shape but may be formed in a U shape. In such a configuration, the slit may include two lateral slits and a vertical slit that connects one ends of the respective lateral slits. The slit may have any shape as long as the positioning portion that is surrounded by the slit and moved by the protrusion can be contacted with and supported by the support portion of the protrusion.

(5) The sound absorbing member of this embodiment may be used for a vehicular interior component including a protrusion without having the reinforcement rib.

(6) The sound absorbing member may include a H-shaped slit in the portion corresponding to the clip seat 20A instead of the recessed portion 38.

The invention claimed is:

1. A sound absorbing member mount assembly comprising:
   a vehicular interior component including a protrusion that protrudes from a vehicular exterior side surface of the vehicular interior component and includes a support portion; and
   a sound absorbing member disposed on the vehicular interior component and including a slit and a positioning portion that is adjacent to the slit, the positioning portion being to be bent and project toward a vehicular exterior side and being supported by the support portion of the protrusion, wherein
   with the positioning portion being bent and supported by the support portion, the sound absorbing member is positioned with respect to the vehicular interior component.

2. The sound absorbing member mount assembly according to claim 1, wherein
   the slit includes at least two first slits that extend in a first direction parallel to each other and a second slit that connects the at least two first slits and extends between middle portions of the at least two first slits with respect to the first direction so as to have an H shape,
   the positioning portion includes a first portion and a second portion that are defined by the first slits and the second slit, and
   the first portion is supported by the support portion and the second portion is supported by a portion of the protrusion that is on an opposite side from the support portion.

3. The sound absorbing member mount assembly according to claim 2, wherein,
   the portion of the protrusion that is on the opposite side from the support portion is a reinforcement rib that extends from the vehicular exterior side surface of the vehicular interior component and also projects from the protrusion along the vehicular exterior side surface, and
   the second portion is supported by the reinforcement rib.

4. The sound absorbing member mount assembly according to claim 2, wherein
   the vehicular interior component has an elongated shape extending in a longitudinal direction, and
   the at least two first slits extend in the longitudinal direction.

5. The sound absorbing member mount assembly according to claim 1, wherein
   the vehicular interior component includes a first protrusion protruding from the vehicular exterior side surface, and
   the sound absorbing member includes a receiving portion at a position corresponding to the first protrusion and the receiving portion is configured to receive the first protrusion.

6. The sound absorbing member mount assembly according to claim 5, wherein the receiving portion is a recessed portion that is recessed from an edge of the sound absorbing member.

7. The sound absorbing member mount assembly according to claim 1, wherein
   the vehicular interior component is to be mounted on a vehicular interior side of an outer panel of a vehicle, and
   the protrusion is a clip seat to which a clip for mounting the vehicular interior component on the outer panel is fitted.

8. The sound absorbing member mount assembly according to claim 1, wherein the support portion includes a flat surface and with the positioning portion being supported by the support portion, the positioning portion is bent and in contact with the flat surface of the support portion.

9. The sound absorbing member mount assembly according to claim 1, wherein the support portion includes at least two support portions and with the positioning portion being supported by the support portions, the positioning portion is bent and in contact with the at least two support portions.

10. The sound absorbing member mount assembly according to claim 1, wherein
    the sound absorbing member includes a body portion, the positioning portion, the slit, and a bending portion that is between the positioning portion and the body portion,
    the positioning portion is surrounded by the slit and the bending portion, and
    the positioning portion is bent along the bending portion such that a projecting end portion of the positioning portion is away from the body portion with the positioning portion being continuous to the body portion via the bending portion.

11. The sound absorbing member mount assembly according to claim 10, wherein with the positioning portion being bent along the bending portion, the projecting end portion of the positioning portion is in contact with the support portion.

12. The sound absorbing member mount assembly according to claim 2, wherein
    the sound absorbing member includes a body portion, the positioning portion, the slit, a first bending portion that is between the first portion and the body portion, and a second bending portion that is between the second portion and the body portion,
    the first portion is surrounded by the first slits, the second slit, and the first bending portion and includes a first projecting end portion,
    the second portion is surrounded by the first slits, the second slit, and the second bending portion and includes a second projecting end portion,
    the first portion is bent along the first bending portion such that the first projecting end portion of the first portion is away from the body portion with the first portion being continuous to the body portion via the first bending portion, and
    the second portion is bent along the second bending portion such that the second projecting end portion of the second portion is away from the body portion with the second portion being continuous to the body portion via the second bending portion.

13. The sound absorbing member mount assembly according to claim 12, wherein with the first portion and the second portion being bent along the first bending portion and the second bending portion, respectively, the first projecting end portion and the second projecting end portion are away from the body portion and in contact with the support portion.

14. The sound absorbing member mount assembly according to claim 1, wherein
the sound absorbing member includes a body portion, and a mount hole that is in the body portion and in which the protrusion is inserted,
the positioning portion is continuous to the body portion via a bending portion,
with the positioning portion being bent along the bending portion, the mount hole is formed,
the positioning portion is movable to close and open the mount hole, and
with the sound absorbing member being mounted on the vehicular interior component and the protrusion being inserted in the mount hole, the positioning portion projects toward the vehicular exterior side and is supported by the support portion of the protrusion.

15. The sound absorbing member mount assembly according to claim 14, wherein
the support portion includes a flat surface,
the positioning portion that projects toward the vehicular exterior side includes a projecting end portion, and
with the protrusion being inserted in the mount hole, the projecting end portion of the positioning portion is in contact with the flat surface of the support portion.

16. The sound absorbing member mount assembly according to claim 14, wherein
the positioning portion that projects toward the vehicular exterior side includes a projecting end portion, and
with the protrusion being inserted in the mount hole, the positioning portion is bent along the bending portion such that the projecting end portion is away from the body portion with the positioning portion being continuous to the body portion via the bending portion.

17. A sound absorbing member mount assembly comprising:
a vehicular interior component including a protrusion that protrudes from a vehicular exterior side surface of the vehicular interior component and includes a support portion having a flat surface; and
a sound absorbing member disposed on the vehicular interior component and including
a body portion,
a mount hole that is in the body portion and in which the protrusion is inserted, and
a positioning portion that is continuous to the body portion via a bending portion and movable to close and open the mount hole, wherein
with the sound absorbing member being mounted on the vehicular interior component and the protrusion being inserted in the mount hole, the positioning portion is bent along the bending portion and projects toward a vehicular exterior side and is supported by the support portion of the protrusion.

18. The sound absorbing member mount assembly according to claim 17, wherein
the support portion includes a flat surface,
the positioning portion that projects toward the vehicular exterior side includes a projecting end portion, and
with the protrusion being inserted in the mount hole, the projecting end portion is in contacted with the flat surface of the support portion.

19. The sound absorbing member mount assembly according to claim 17, wherein
the positioning portion that projects toward the vehicular exterior side includes a projecting end portion, and
with the protrusion being inserted in the mount hole, the positioning portion is bent along the bending portion such that the projecting end portion is away from the body portion with the positioning portion being continuous to the body portion via the bending portion.

\* \* \* \* \*